Feb. 1, 1972 A. G. KITCHEN ETAL 3,639,517
RESINOUS BRANCHED BLOCK COPOLYMERS
Filed Sept. 22, 1969 3 Sheets-Sheet 1
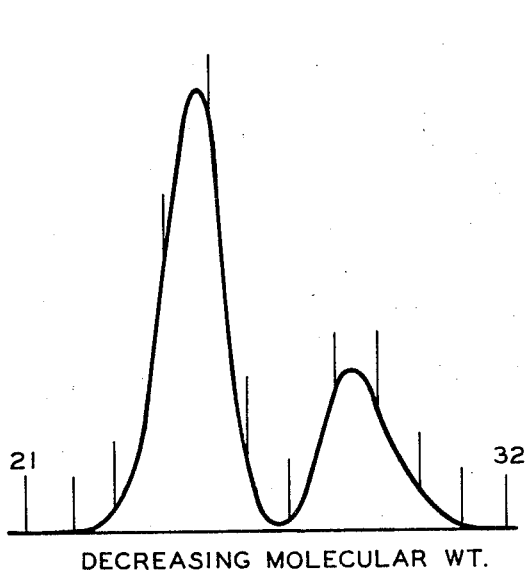
FIG. 1b
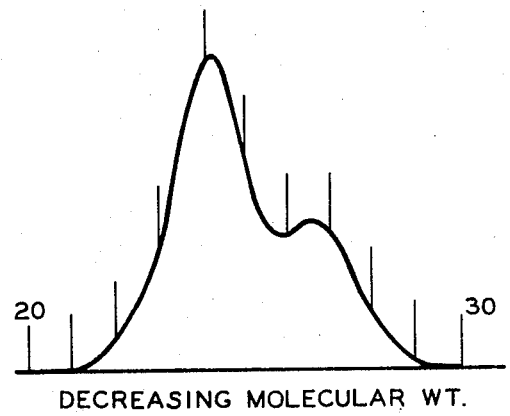
FIG. 1d
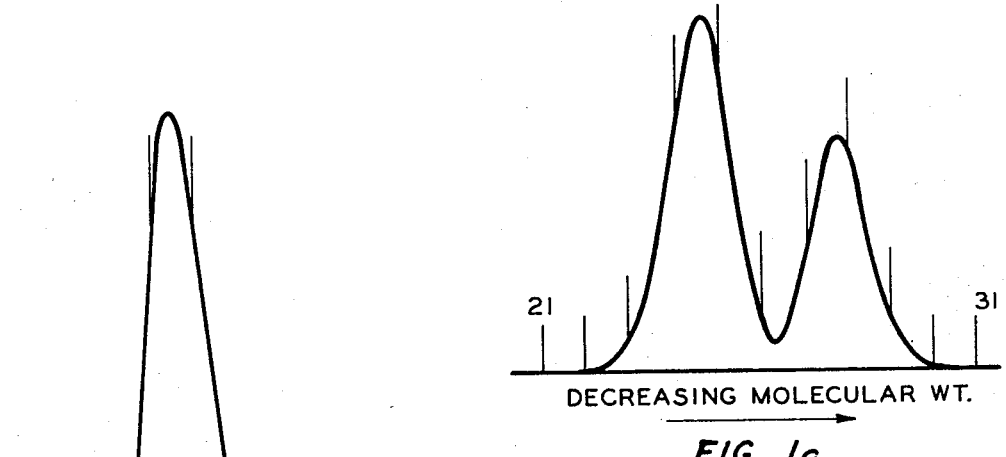
FIG. 1c
FIG. 1a
INVENTORS
A. G. KITCHEN
F. J. SZALLA
BY *Young and Quigg*
ATTORNEYS

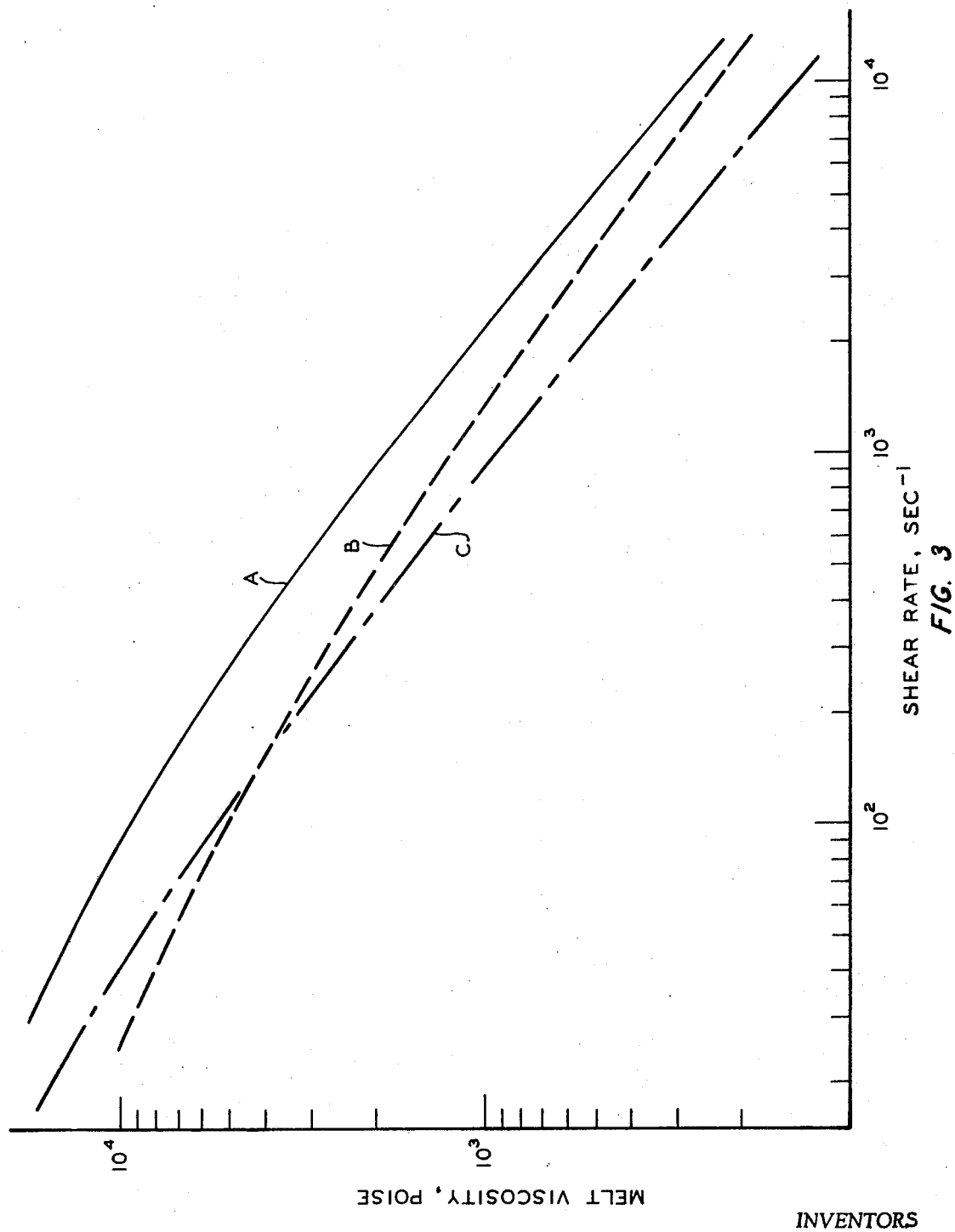

United States Patent Office 3,639,517
Patented Feb. 1, 1972

3,639,517
RESINOUS BRANCHED BLOCK COPOLYMERS
Alonzo G. Kitchen and Frank J. Szalla, Bartlesville, Okla., assignors to Phillips Petroleum Company
Filed Sept. 22, 1969, Ser. No. 859,861
Int. Cl. C08f 19/08
U.S. Cl. 260—879　　　　　　　　　　　　　12 Claims

ABSTRACT OF THE DISCLOSURE

Monovinyl-substituted aromatic hydrocarbons and conjugated dienes are sequentially polymerized with multiple additions of initiator and monovinyl-substituted aromatic monomer and subsequently treated with a polyfunctional treating agent to form resinous branched block copolymers which are polymodal in regard to molecular weight distribution.

---

Figure 2B:
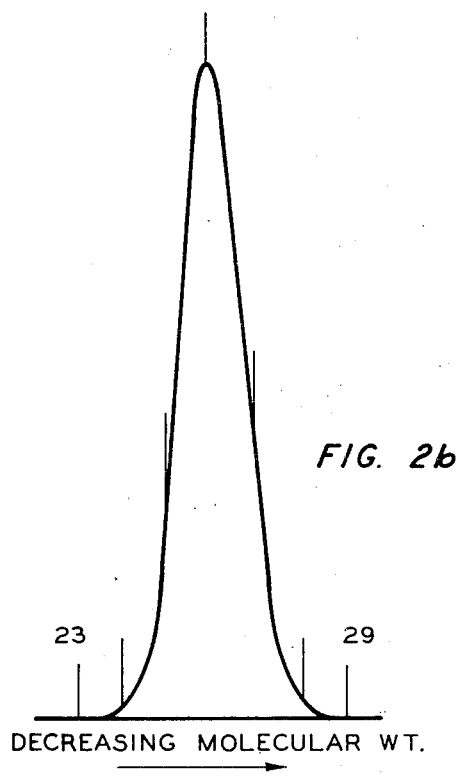

This invention relates to novel polymodal resinous thermoplastic branched block copolymers and to articles manufactured therefrom.

In another aspect this invention relates to a novel polymerization process for the production of polymodal resinous branched block copolymers which can be molded into transparent articles.

There has developed in the polymer field, and especially in the packaging and related industries, a need for thermoplastic polymers that can be formed into transparent articles having high impact strength and which are suitable for use with conventional injection and blow molding equipment and also suitable for use in other methods of forming plastics into containers, tubes, films, fibers, and the like. Polystyrene, high impact polystyrene, branched block copolymers, and the like, have been developed with various degrees of satisfaction to meet these criteria. A resinous polymer that can be formed into articles that possess a combination of good stiffness and impact strength, as well as being transparent, is definitely in demand in the polymer filed. Polymer articles that have satisfactory clarity, such as those made from polystyrene polymers, are lacking in impact strength. Articles formed from blends of polymers, such as high impact polystyrene, often possess the satisfactory impact strength but lack sufficient clarity or other requisite properties. Blends of polystyrene with various compounds such as butadiene-styrene copolymers have been developed but as the impact strength of these plastic articles is increased there is also an increase in the opaqueness of the article and therefore they too have limited application. Polymers that can be employed to form articles possessing good clarity and strength often pose difficulties when processing them in conventional equipment. There is therefore a recognized need for suitable polymers in the packaging and related industries, especially in the food packaging industry where large varieties of products are employed. It is essential in food packaging that the articles employed to contain these products do not fail and allow leakage, contamination, etc., of the product. A particularly difficult problem is encountered when the plastic containers are employed for food products having oily bases such as butter, lard, margarine, cooking oil, and the like. The environmental stresses created by these oily bases often result in failure of the container.

Summarily, a polymer suitable for use in forming transparent articles possessing high impact strength and high environmental stress resistance while possesing good processability in conventional equipment is particularly needed.

A novel resinous branched block copolymer has now been discovered that surprisingly fulfills all of these requirements and thus combines the attributes of strength, clarity, processability, and environmental durability into a single polymer.

The polymers of ths invention can be broadly described as branched block copolymers and are an improvement on the prior art branched block copolymers, such as described in U.S. Pat. 3,281,383, issued to Zelinski et al. Oct. 25, 1966. Zelinski et al. have therein conveniently referred to their branched polymers as radial polymers because they have relatively long polymer branches radiating from a nucleus formed from a polyfunctional treating or coupling compound. These radial polymers possess many excellent properties and are particularly described therein as having little if any tendency to undergo cold flow, and yet have better processing properties than other polymers of comparable Mooney values prepared by prior art methods. The polymers prepared according to the preferred process of the instant invention can also be broadly referred to as radial polymers although they are distinguishable over the prior art radial polymers and possess even more outstanding properties.

The polymers prepared according to this invention are polymodal, resinous, branched block copolymers and contain from about 70 to 95 weight percent of polymerized monovinyl-substituted aromatic hydrocarbon monomer based on the weight of the total monomers employed. The polymers of this invention when formed into articles not only exhibit surprising and outstanding properties such as impact strength and high environmental stress cracking resistance but are transparent as well. The polymers also exhibit remarkable processability and can be employed in conventional processing equipment with ease.

The polymers of this invention are prepared by a novel polymerization process employing the sequential polymerization of monovinyl-substituted aromatic hydrocarbon and conjugated dienes. The non-elastomeric blocks or segments are first formed by multiple additions of monovinyl-substituted aromatic hydrocarbon monomer and organolithium initiator. Subsequently, the conjugated diene is added and polymerized to form an elastomeric polymer block followed by the addition of a polyfunctional treating agent. The multiple addition or charging of the monovinyl-substituted aromatic hydrocarbon monomer and the organolithium initiator must be made at particularly described concentrations.

It is thus an object of this invention to provide a novel branched block copolymer. It is an object of this invention to provide a process for producing polymodal resinous block copolymers which can be formed into transparent articles. It is an object of this invention to provide a polymer than can be easily processed and formed into articles that exhibit high impact strength and environmental stress cracking resistance. It is a further object of this invention to fulfill a need in the packaging industry by providing a polymer suitable for making articles possessing the particularly desired properties of strength, clarity and stability. Further objects and advantages of this invention will become apparent to those skilled in the art from the following description and discussion herein set forth.

FIGS. 1(a) through 1(d) and 2(a) through 2(c) represent gel permeation chromatograph curves of polymer obtained in the preparation of polymodal and regular radial polymers respectively. FIG. 3 is a log-log plot of melt viscosity versus shear rate in reciprocal seconds of various polymodal and regular radial polymers.

According to our invention a polymodal branched block copolymer is produced that possesses excellent processability. Articles prepared from said polymers possess excellent transparency, outstanding strength characteristics as well as excellent environmental stress cracking resistance.

Specifically, in our polymerization process, non-elastomeric (resinous) blocks of polymer must be first formed. The resinous portion of the block copolymer is formed by charging a substantial portion of the total amount of monovinyl-substituted aromatic hydrocarbon monomer employed to a polymerization vessel and contacting said monomer with a relatively small amount of organolithium initiator and maintaining polymerization conditions for a period of time sufficient to convert essentially all of the monomer and the initiator to relatively long non-elastomeric chains of living polymer having active terminal lithium atoms.

The remainder of the total monovinyl-substituted aromatic hydrocarbon monomer employed is then charged in one or more increments, to said polymerization vessel containing the polymerization reaction product of the first charge such that each incremental charge of monomer is accompanied by a corresponding incremental charge of initiator so that a relatively large amount of initiator is employed per amount of monomer. The polymerization conditions are maintained and after each incremental charge of monomer and initiator a sufficient time is allowed to convert essentially all of the newly added monomer and initiator to non-elastomeric chains of living polymer.

After the non-elastomer polymer fraction has been prepared, the chains of non-elastomeric living polymer are contacted with conjugated diene monomer which is charged to the polymerization vessel and the reaction mixture is allowed to polymerize again to essential completion to form chains of living copolymer containing both elastomeric and non-elastomeric blocks.

The polyfunctional treating agent is then added to the polymerization mixture under reaction conditions sufficient to form branched copolymers containing both the elastomeric and non-elastomeric blocks. Thus, the polyfunctional treating agent is added to the polymerization mixture after the polymerization has been essentially completed but prior to deactivation of the polymerization initiator.

The polymer can be recovered after the polyfunctional treating agent has formed the branched block copolymers. Recovery of the polymers can be by conventional methods used for recovering polymer from organometal polymerization mixtures such as by treatment with materials containing active hydrogen such as alcohols, aqueous acids, and the like.

As hereinbefore stated, the non-elastomeric polymer fraction is first formed by the multiple addition of both the monomeric material and polymerization initiator. At least two additions of the monovinyl-substituted aromatic hydrocarbon and the polymerization initiator are required.

In the first addition step the monovinyl-substituted aromatic hydrocarbon is added in an amount to provide from about 40–90 weight percent preferably at least 60 weight percent of the total monovinyl-substituted aromatic hydrocarbon employed in the total copolymer composition. An organolithium initiator is employed with said first addition step in an amount to provide from about .01 to 0.2 part by weight per 100 parts by weight of monomer employed in said first addition. This first charge of monovinyl-substituted aromatic hydrocarbon, representing about 40–90 weight percent of the total monovinyl-substituted aromatic hydrocarbon monomer employed in preparing the block copolymer, is then allowed to polymerize to essential completion.

The remaining monovinyl-substituted aromatic hydrocarbon monomer, i.e., from about 10 to 60, preferably less than 40, weight percent of the total monovinyl-substituted aromatic hydrocarbon employed, is charged, in one or more increments, to this reaction mixture. For each incremental charge of monomer there is another charge of organolithium polymerization initiator. The polymerization initiator is preferably charged to said reaction mixture prior to charging said remaining monovinyl-substituted aromatic hydrocarbon monomer. From about 0.1 to about 1.5 parts of organolithium polymerization initiator per 100 parts of monomer employed in each incremental charge of the monovinyl substituted aromatic hydrocarbon monomer is also added. After each incremental charge of monomer and initiator a sufficient time is then allowed to polymerize the newly added monomer to essential completion. Although it is preferred to employ only two charges of monovinyl-substituted aromatic hydrocarbon monomer, more than two additions can be made if desired by dividing the second described monomer charge, i.e., representing 10–60 weight percent, into as many increments as wanted.

At the completion of the multiple additions and subsequent-polymerizations of the monovinyl-substituted aromatic hydrocarbon, the conjugated diene monomer, representing from about 30–5 weight percent of the total monomeric material employed in the polymer preparation, is charged to the reaction mixture and is allowed to form a block copolymer with the previously polymerized monovinyl-substituted aromatic hydrocarbon monomer. No additional initiator is added with the diene charge. The conjugated diene is converted to the copolymer by contact with the reactive terminal lithium atoms of the previously prepared living non-elastomeric polymer.

Summarily, the first addition of initiator accompanies the first monovinyl-substituted aromatic monomer addition and is added in an amount to provide from about .01 to 0.2, preferably 0.03 to 0.10 part by weight of initiator per 100 parts by weight of monomer. The second addition of initiator is charged in an amount to provide from about 0.1 to 1.5, preferably 0.3 to 1.5 parts by weight of initiator per 100 parts by weight of the monomer then charged. In order to obtain the improved results of the present invention, the proportion of initiator to monomer in all monomer-initiator additions beyond the first should be substantially greater than that of the first addition. Thus, the amount of initiator per 100 parts of monomer in the later additions should exceed that of the first by at least about 0.1 and preferably by at least about 0.2 part initiator per 100 parts monomers by weight.

It should be understood that various impurities or catalyst poisons may be present in the monomers, solvents, and reaction apparatus employed and adjustments may be necessary in the initiator level to provide the requisite amounts of active initiator levels over and above the amounts destroyed by such catalyst poisons. The determination of the "poison level" of a catalytic system is a conventional operation and within the skill of the art.

The monovinyl - substituted aromatic hydrocarbon monomers, or mixtures thereof, that are employed according to this invention contain from about 8–18 carbon atoms per molecule. Examples of suitable compounds include: styrene, 3-methylstyrene, 4-n-propylstyrene, 4-cyclohexylstyrene, 4-dodecylstyrene, 2 - ethyl - 4 - benzylstyrene, 4-p-tolylstyrene, 4-(4-phenyl-n-butyl)styrene, 1-vinylnaphthalene, 2-vinylnaphthalene, and the like. The monovinyl-substituted aromatic hydrocarbon can contain alkyl, cycloalkyl, and aryl substituents, and combinations thereof such as alkylaryl in which the total number of carbon atoms in the combined substituents is generally not greater than 12. Styrene is presently preferred because of its availability and effectiveness.

Conjugated dienes, and mixtures thereof, that can be employed as monomers according to this invention generally contain from about 4–12 carbon atoms per molecule and those containing from about 4–8 carbon atoms are preferred. Exemplary of suitable compounds are: 1,3-butadiene, isoprene, 2,3-dimethyl-1,3-butadiene, piperylene, 3-butyl-1,3-octadiene, phenyl-1,3-butadiene, and the like. Butadiene-1,3 is particularly effective and presently preferred.

The polymerization initiators employed according to this invention are well known and can be broadly depicted as organolithium initiators. Those preferred are hydrocarbyl monolithium compounds and can be represented by the formula RLi wherein R is a hydrocarbon radical selected from aliphatic, cycloaliphatic, or aromatic radicals containing from about 1 to 20 carbon atoms per molecule. Exemplary initiators suitable for use according to this invention include: n-butyllithium, sec-butyllithium, methyllithium, phenyllithium, naphthyllithium, p-tolyllithium, cyclohexyllithium, eicosyllithium, and the like. Because it is particularly effective, n-butyllithium is presently preferred.

As previously outlined, at the conclusion of the polymerization of the conjugated diene a polyfunctional treating agent containing at least two functional groups capable of reacting with the terminal lithium atoms on the preformed polymer is employed to form a branched polymer. It is preferred, however, to employ polyfunctional treating agents having at least three functional groups.

The polymer formed following reaction with the polyfunctional treating agent having at least three functional groups can be broadly characterized as a radial polymer. If a difunctional treating agent is employed to form the branched block copolymers of this invention, it must itself be a monomeric material capable of addition to itself under polymerization conditions.

Some polyfunctional treating agents that can be employed according to this invention in the preparation of the branched block copolymers are the polyepoxides such as epoxidized linseed oil and 1,2,5,6,9,10-triepoxydecane, polyimines such as tri(1-aziridinyl)phosphine oxide, polyisocyanates such as benzene-1,2,4-triisocyanate, polyaldehydes such as 1,4,7-naphthalene tricarboxyaldehyde, polyhalides such as silicon tetrachloride or polyketones such as 1,4,9,10-anthracenetetrone. The aforementioned treating agents are described in U.S. Patent 3,281,383, issued to Zelinski et all. Oct. 25, 1966, and are hereby incorporated by reference thereto. Tin compounds disclosed in U.S. Patent 3,393,182, issued to Trepka July 16, 1968, are also suitable. Examplary compounds are tetrallyltin, stannic fluoride, and the like. The polyvinyl aromatic compounds as disclosed in U.S. Patent 3,280,084, issued to Zelinski et al. Oct. 18, 1966, such as divinylbenzene are suitable difunctional treating agents.

The particular polyfunctional treating agent employed in this invention is not critical so long as said agent is capable of forming branched polymer by reacting with active terminal lithium atoms of a living polymer provided that said agent does not substantially impair the desired properties of the final polymer. The number of functional groups per molecule of the polyfunctional treating agent employed in the preparation of the branched block copolymer is preferably at least 3. The treating agents such as those disclosed in U.S. Patent 3,280,084, i.e., polyvinyl aromatic compounds which are themselves monomeric materials such as divinylbenzene are suitable for use in this invention in that they provide a branched block copolymer but not necessarily a typical radial polymer.

The polyfunctional treating agent is employed in an amount sufficient to provide from about 0.05 to 2, preferably 0.5 to 1.5, equivalents of said agent per gram atom of lithium employed in the initiator. One functional group of said polyfunctional treating agent, i.e. one equivalent is the optimum amount to be employed per gram atom of lithium. The polyfunctional treating agent is added to the polymerization mixture after the polymerization has been completed and prior to the deactivation of the initiator.

In order to prepare a polymer possessing the hereinbefore described attributes the polymerization is conducted at any temperature suitable for polymerization up to about 250° F., preferably below about 230° F.

The polymerization reaction can be conducted under autogenous pressure. It is usually desirable to operate at pressures sufficient to maintain the monomeric material substantially in the liquid phase.

Polymerization can be conducted in the presence or absence of diluent. Inert hydrocarbon diluents selected from aromatics, paraffins, or cycloparaffins, and mixtures thereof, containing from about 4 to 10 carbon atoms per molecule can be suitably employed. The diluent or diluent mixture is one which is liquid under conditions of the polymerization process and exemplary diluents are isobutane, n-pentane, cyclohexane, benzene, toluene, xylene, naphthalene, and the like. As in all such catalytic reactions, the polymerization are conducted in the substantial absence of air or moisture, preferably in an inert atmosphere.

Small amounts of an ether compound, such as tetrahydrofuran, can also be employed in the polymerization reaction. Amounts of tetrahydrofuran to provide from about .005 to 5 weight percent of tetrahydrofuran based on the total monomer charge, preferably .05 to .1 weight percent, are considered suitable. The tetrahydrofuran appears to reduce the induction period of some of the initiators, such as n-butyllithium, and its presence appears active in improving the clarity of final polymer articles.

The branched block copolymers formed when the polyfunctional treating agent contains at least three functional groups can be broadly depicted as an $(A-B)_xY$ type polymer, wherein A represents the non-elastomeric polymer blocks or segments and B represents the elastomeric polymer segments. Y is an atom or group of atoms derived from the polyfunctional treating agent used in the formation of the radial polymers and $x$ represents the number of functional groups of said polyfunctional treating agent and is an integer of at least 3.

The radial block copolymers produced according to this invention using a polyfunctional treating agent having at least three functional groups can thus be characterized as having at least three polymer branches with each branch of the radial block copolymer comprising terminal non-elastomeric segments. The branches of the radial block copolymer thus contain terminal non-elastomeric segments and an elastomeric polymer segment joined thereto.

Regardless of the polymer configuration, the terminal non-elastomeric segments of the polymodal branched block copolymer comprise from about 70 to 95, preferably 75 to 85 weight percent of the total weight of the block copolymer with the elastomeric segments comprising about 30 to 5, preferably about 25 to 15 weight percent of the total weight of the block copolymer based upon the total weight of all the monomers charged.

Subject to the above limitations, the terminal non-elastomeric segments can contain small quantities of polymerized conjugated diene monomer and the elastomeric segment can contain small quantities of polymerized monovinyl-substituted aromatic hydrocarbon such as in a random copolymer.

It is important that each of the polymer segments retain their relative non-elastomeric and elastomeric properties but as long as these small amounts of different monomeric material do not substantially affect their relative properties they can be employed. Generally, the non-elastomeric segments should not contain more than 30 weight percent polymerized conjugated diene nor the elastomeric segment more than 30 weight percent polymerized monovinyl-substituted aromatic hydrocarbon.

According to our invention, however, it is preferred that each of the non-elastomeric segments and elastomeric segments be homopolymers of monovinyl-substituted aromatic hydrocarbon and conjugated diene, respectively.

The new polymers produced according to this invention are further characterized as polymodal branched block copolymers. The term polymodal refers to the plurality of modes or peaks in the gel permeation chromatograph curve of our polymers, i.e., the molecular weight distribution curve, when compared to the other known branched polymers such as those described in U.S. Patent 3,281,383, issued to Zelinski et al. Oct. 25, 1966 which do not show a plurality of modes and have a comparatively narrow molecular weight range. It should also be emphasized that the polymodal polymers of this invention possess other distinguishing properties over the known radial polymers such as improved processability and articles formed therefrom possess outstanding impact strength, clarity and environmental stress cracking resistance. Although the polymodal polymers of this invention do have a broader molecular weight distribution over the other known radial polymers, it is not believed that the broader molecular weight distribution alone accounts for all of these distinguishing properties.

The polymodal branched block copolymers of this invention are characterized in that they possess a melt flow in the range of about 0.5 to 20.0 and generally one from about 1.0 to 5.0 as determined by ASTM D-1238-65T, condition G.

Formed articles from the polymodal branched block copolymers have a haze transmittance in the range of about 0 to 20 percent and generally from 0 to 10 percent as determined by ASTM Method D-1003-61, Procedure A. Said articles have a falling ball impact strength value in ft.-lbs. of at least 1.0 and generally about 5.0 to 16.0 ft.-lbs. and often greater when calculated according to the following procedure: A ball of known weight is dropped from various heights until a height is found where four out of four samples tested, such as cereal bowls, crack when struck by the falling ball. Next, a height is found where two out of four bowls crack and finally a height where no bowls crack. These heights versus the percent failures are plotted on probability scale paper and the best straight line is drawn between those three points. The point of intersection between the drawn line and the 50 percent line is called the F50 value. The F50 value in feet multiplied by the weight of the ball in lbs. provides the falling ball impact strength value in ft.-lbs.

Said polymers are further characterized in that articles formed therefrom have an environment stress cracking resistance value in days of at least 100 days at zero percent failure when determined according to procedure of Example II.

Illustrative of the foregoing discussion and not to be interpreted as a limitation on the scope thereof, the following examples are presented.

EXAMPLE I

Polymodal branched block copolymers were prepared according to this invention. For comparative and control purposes radial polymers produced according to U.S. Patent 3,281,383 were also prepared. The latter compounds are referred to as regular radial polymers and those produced according to our invention as polymodals or as polymodal branched block copolymers. Regular radial and polymodal polymers of similar melt flow were produced to provide good comparative testing.

A typical polymodal polymer was produced according to the following recipe:

POLYMODAL POLYMER PREPARATION

First charge: Amount
   Cyclohexane _____pounds__ 16.0
   Styrene _____grams__ 1,050
   n-Butyllithium _____do____ .65
   Tetrahydrofuran (THF) _____cc's__ 4.0
   Initial temperature, 130° F.
   Polymerization time <30 minutes.

Second charge:
   Cyclohexane _____pound__ 1.0
   n-Butyllithium _____grams__ 1.8
   Styrene _____do____ 450.0
   Initial temperature, 160° F.
   Polymerization time <1 hour.

Third charge:
   Cyclohexane _____pound__ .5
   Butadiene _____grams__ 500
   Initial temperature, 165° F.
   Polymerization time <1 hour.

Fourth charge:
   Epoxol 9–5 [1] in toluene solution (0.5 gram/cc.) _____cc's___ 20
   Cyclohexane _____pound__ .5
   Initial temperature, 180° F.

[1] Epoxidized linseed oil, commercial, approximately five functional groups per molecule.

The cyclohexane and THF were charged to a 5-gallon stirred reactor vessel first. The monomer and initiator were added in the order indicated in the recipe. The polymerizations were begun at the temperatures shown in the recipe and were not permitted to exceed 250° F. Polymerizations were allowed to continue until essentially completed before the subsequent charge was made. At the conclusion of the polymerization and coupling, the reactor was emptied into isopropyl alcohol and recovered. The dried polymodal polymer was conventionally treated with 2 parts by weight of polymer antioxidant per 100 parts by weight of polymer. The antioxidants employed were 1.5 parts Polygard HR [1] and 0.5 part BHT.[2]

Other polymodal branched block copolymers were prepared according to the foregoing procedure and the essential data representing the polymer preparation and properties thereof are reported in Table I.

Regular radial polymers were produced according to the following formula and procedure and all of the polymerization were allowed to continue until essential completion before the subsequent charge was made.

First charge: Amount
   Cyclohexane _____pounds__ 17.0
   Styrene _____grams__ 1400
   n-Butyllithium _____do____ 2.6
   Initial temperature, 130° F. _____
   Polymerization time <30 minutes _____

Second charge:
   Cyclohexane _____pound__ .5
   Butadiene _____grams__ 600

Third charge:
   Epoxol 9–5 in toluene solution (.5 gram/cc.) _____cc__ 20
   Acylohexane _____pound__ 600 modal polymer. Table I contains data for polymer preparation of other radial polymers and also represents comparative testing of the properties of the regular radial and the polymodal polymer.

[1] Tri(monylphenyl)phorphite containing 1% triisopropanolamine.
[2] 2,6-di-tert-butyl-4-methylphenol.

TABLE I.—POLYMODAL BRANCHED BLOCK COPOLYMER

| | Preparation, styrene portion | | | | | | Properties | | | | | |
|---|---|---|---|---|---|---|---|---|---|---|---|---|
| | 1st charge | | 2d charge | | Percent[3] | | | | | | Falling ball[7] | Falling ball[8] |
| Run No. | Weight percent[1] | n-Butyl-lithium[2] | Weight percent[1] | n-Butyl-lithium[2] | Styrene | Butadiene | Melt flow[4] | Flex. mod.,[5] p.s.i. ×10⁻³ | Tensile, p.s.i.[6] | Elong., percent[6] | impact, ft.-lbs. | impact, ft.-lbs. |
| A[a] | 60 | 0.05 | 40 | 0.45 | 80 | 20 | 2.7 | 305 | 4,740 | 12 | 1.0 | |
| B | 60 | 0.05 | 40 | 0.70 | 80 | 20 | 3.6 | 300 | 4,220 | 31 | 1.4 | |
| C[b] | 60 | 0.06 | 40 | 0.37 | 75 | 25 | 3.2 | 256 | 4,250 | 72 | 5.0 | |
| D[b] | 70 | 0.06 | 30 | 0.40 | 75 | 25 | 2.4 | 252 | 4,210 | 113 | 16.6 | |
| E[b] | 70 | 0.06 | 30 | 0.53 | 75 | 25 | 3.9 | 256 | 4,030 | 128 | 15.9 | |
| F | 60 | 0.03 | 40 | 0.35 | 80 | 20 | 0.9 | | | | | 1.8 |
| G | 70 | 0.03 | 30 | 0.50 | 80 | 20 | 1.1 | | | | | >5.0 |

| | Regular radial | | | | | | | | | | | |
|---|---|---|---|---|---|---|---|---|---|---|---|---|
| | n-Butyllithium[9] | | | | | | | | | | | |
| H | .10 | | | | 85 | 15 | 4.2 | 314 | 4,760 | 6 | <.04 | |
| I | .13 | | | | 75 | 25 | 4.4 | 220 | 4,040 | 15 | 0.15 | |
| J | .13 | | | | 70 | 30 | 3.3 | 201 | 3,300 | 11 | 0.24 | |
| K | .09 | | | | 80 | 20 | 2.1 | | | | | 0.85 |
| L | | | | | 100 | | 1.8 | | | | | <0.1 |

[1] Weight percentage of total styrene employed in polymer preparation.
[2] Parts by weight n-butyllithium per 100 parts by weight of styrene charged in that portion.
[3] Weight percentage based upon total weight of all monomers employed.
[4] Determined by ASTM D 1238–65T, Condition G, at 200° C. with 5 kg. weight.
[5] Determined by ASTM D 790.
[6] Determined by ASTM D 638.
[7] Falling ball impact of injected molded bowls using a free falling steel ball (0.71 and 2.3 lbs.) dropped at varying heights. Values calculated from height of drop at 50 percent failures. Bowls are molded on a Model 75 B New Britain reciprocating screw injection molding machine. The bowl bowl is single cavity, center gated and gives a part weight of 40 grams. The nozzle diameter is ⅛ inch and is a pressure operated type with back-flow type screw tip. The bottom of the bowl is 70 mils. Molding conditions are as follows:

```
Rear zone temp., ° F ------------------------------- 440
Front zone temp., ° F ------------------------------ 450
Mold temp., ° F ------------------------------------ 125
Screw, r.p.m. -------------------------------------- 104
Injection pressure, p.s.i. ------------------------- 15,000
Hold pressure, p.s.i. ------------------------------ 6,000
Injection time, sec. ------------------------------- 2
Total cycle, time, sec. ---------------------------- 38
```

[8] Samples tested were 30 mil extruded sheets using a free falling 0.71 pound steel ball dropped at varying heights. Values calculated from height of drop at 50 percent failures.
[9] Parts by weight per 100 parts by weight of all monomers employed.
[10] Polystyrene general purpose. commercial product—Styron 700.
[a] Polyfunctional treating agent—silicon tetrachloride, 0.10 parts by weight per 100 parts by weight total monomer employed instead of Epoxl 9–5.
[b] Tetrahydrofuran at 0.10 parts by weight per 100 parts by weight total monomer added to diluent prior to polymerization.

Table I effectively demonstrates some of the outstanding properties and especially the surprising impact strength of the transparent polymodal branched block copolymers produced according to this invention.

EXAMPLE II

Environmental stress cracking resistance tests were conducted upon thermoformed containers filled with a commercial cooking oil to determine the effectiveness of the polymodal block copolymers of this invention in resisting environmental breakdown. Polymer resistance to oil-based products, such as food, etc., is essential for actual consumer use and zero failures of a container is therefore necessarily required. The regular radial polymers were also tested for comparison. All of the polymers were prepared as in Example I to provide regular radial and polymodal polymer samples of similar melt flow.

The containers employed were prepared according to following description. A sheet, 30 mils thick, is extruded with a 1½ Davis standard extruder, a 17 inch Goulding sheet die, and Goulding sheet line. The polymer temperature is 380 to 400° F. A light nip is used on the take-up rolls. The sheet is formed into food tubs with a Comet Labmaster Model L5 thermoformer. The containers are round with a depth at the center of about 1⅝ inches and I.D. at the top of about 4⅜ inches. The bottom of the formed tub is 15 to 20 mils and the side walls are 10 to 15 mils. A commercial cooking oil is placed in the containers and covered with a lid. The containers are aged in a refrigerator at 40° F. until a leak occurs. This data is reported in Table II.

TABLE II

| Run Number | | Styrene/butadiene content (weight, percent) | Melt[1] flow | Number containers started | Number failed | Total, days tested |
|---|---|---|---|---|---|---|
| A | Regular radial | 75/25 | 3.0 | 10 | 5 | 160 |
| B | Regular radial | 70/30 | 3.1 | 5 | 3 | [2] 148 |
| C | Regular radial | 65/35 | 3.6 | 5 | 5 | .1 |
| D | Regular radial | 80/20 | 2.8 | 5 | 0 | [2] 139 |

[1] As reported in Table I.
[2] Containers still being tested.

Table II effectively demonstrates the superiority of the polymodal branched block copolymers produced according to this invention as to their environmental stress cracking resistance.

EXAMPLE III

Tests were conducted to illustrate the outstanding clarity of the polymodal branched block copolymers of this invention. The polymers were prepared as in Example I and the polymer properties are reported in Table III. The percentage haze of the regular radial polymer and several commercial resins are reported for comparative purposes.

The haze of a specimen is that percentage of transmitted light which in passing through the specimen deviates from the incident beam by forward scattering. The percent haze was determined on 10 mil compression molded slabs according to ASTM Method D1003–61, Procedure A, using a Hazemeter. Only light flux deviating more than 2.5 degrees on the average was considered to be haze. The percentage haze is calculated as follows: Haze, percent = $Td/Ti \times 100$ where $Td$ = diffuse transmittance and $Ti$ = total transmittance. Although haze is a comparative term because it depends on molding conditions and the thickness of the sample, the polymer samples employed in this example were molded under identical conditions to 10 mil slabs to insure unbiased ratings.

tion (Krueger HAK–1 pads). Flow rate was about 1 ml. per minute at room temperature through a four column array in series in the porosity order of $10^7$, $10^5$, $10^4$, and $10^3$ angstroms.

TABLE III.—POLYMODAL BRANCHED BLOCK COPOLYMERS

| | Preparation, styrene portion | | | | | Properties | | | |
|---|---|---|---|---|---|---|---|---|---|
| | 1st charge | | 2nd charge | | Weight percent THF [2] | Styrene [1] | Butadiene [1] | Melt flow [1] | Percent haze [3] |
| Run No. | Weight percent [1] | n-Butyl-lithium [1] | Weight percent [1] | n-Butyl-lithium [1] | | | | | |
| A | 60 | 0.03 | 40 | 0.38 | 0 | 80 | 20 | 1.1 | 3.2 |
| B | 60 | .05 | 40 | 0.60 | 0 | 80 | 20 | 4.6 | 3.0 |
| C | 70 | .06 | 30 | 0.43 | 0.10 | 78 | 22 | 2.0 | 2.0 |
| D | 70 | .06 | 30 | 0.53 | 0.10 | 75 | 25 | 3.0 | 2.5 |

| | Regular radial | | | | | | |
|---|---|---|---|---|---|---|---|
| | N-Butyllithium (phm.) [4] | | | | | | |
| E | 0.10 | | 85 | 15 | 3.4 | 5.0 |
| F | 0.13 | | 70 | 30 | 2.6 | 5.0 |
| G | 0.10 | | 75 | 25 | 2.4 | 2.5 |

| | Commercial resins | | | | |
|---|---|---|---|---|---|
| | Trade name (supplier) | Type of polymer | | | |
| H | Styron 700 (Dow) | Polystyrene | | 2.5 | 2.9 |
| I | Type 20-D (Foster Grant) | do | | 8.0 | 2.2 |
| J | Tenite (Eastman) | Cellulose acetate | | 4.5 | 7.5 |
| K | XT-250 (Cyanamid) | Acrylic multipolymer | | 0.7 | 4.5 |

[1] As reported in Table I.
[2] Weight percent THI based on total weight of monomers.
[3] Percentage haze determined from 10 mil compression molded slabs according to ASTM method D 1003-61, procedure H, employing a Hazemeter.
[4] Parts by weight per 100 parts by weight total monomer.

From the foregoing data it is apparent that the clarity of the polymers of our invention, when compared to other known polymers of equivalent metal flow, is definitely superior or equal thereto. The degree of clarity, i.e., the lack of haze of the polymodal polymers of this invention is truly surprising especially when one considers the polymers employed as controls and further in view of the already demonstrated strength characteristics of the polymodal branched block copolymers.

EXAMPLE IV

The following example is presented to illustrate the polymodal nature of the polymers of our invention. Gel permeation chromatograph curves demonstrating the molecular weight distribution of the polymodal branched block copolymers is presented as well as is data for the regular radial polymers of the prior art. A gel permeation chromatographic curve (GPC) is reported for each polymer portion prepared after each step in the polymerization process, i.e., following completion of each step according to the process of this invention a polymer sample was withdrawn and a GPC curve made therefor. The heterogeneity index (HI) is reported as well. The heterogeneity index (HI) is employed as a synonymous expression for polydispersity and is the ratio of $M_w/M_n$,[1] when this ratio is obtained by gel permeation chromatography. This ratio has a theoretical minimum value of 1. A polymer possessing a ratio of 1 is said to be monodispersed. The broadness of the molecular weight distribution, or polydispersity, is thus reflected by the value of this ratio, i.e., the larger the HI number, the broader the molecular weight distribution, or the greater the polydispersity.

Gel permeation chromtograms were obtained using a Waters Associates Model 100 GPC utilizing polystyrene gel packed columns of the best available quality. Polymer solutions were prepared to 0.05 weight volume percent in tetrahydrofuran. Sample size was 2 mls. of filtered solu-

[1] A commonly employed method of expressing the molecular weight distribution is in the form of a ratio $M_w/M_n$, wherein $M_w$ equals the weight average molecular weight and $M_n$ equals the number average molecular weight.

A polymodal branched block copolymer was prepared according to the following polymerization procedure. To a three-liter stirred reactor was charged 0.5 pound of cyclohexane solvent at a reactor temperature of 164° F. 108.0 grams of styrene monomer was then charged and 0.3 pound of cyclohexane solvent. 4.3 grams of a 1.0 weight percent n-butyllithium solution and 0.2 pound of cyclohexane solvent were charged and the reaction mixture was allowed to polymerize for 20 minutes. Following essentially complete polymerization of the styrene monomer an additional 28.8 grams ot 1.0 weight percent n-butyllithium solution and 0.2 pound of cyclohexane, 72.0 grams of styrene monomer and 0.3 pound of cyclohexane was added to the reactor and styrene allowed to polymerize for an additional 20 minutes. Butadiene monomer was then added and polymerized for 20 minutes. Following the butadiene polymerization, 2.3 ccs. of Epoxol 9–5 in a toluene solution containing 0.5 gram of Epoxyl 9–5 per cc. of solution, 0.5 weight percent Epoxyl 9–5, based upon the total weight of monomer employed in the polymer preparation, was added and allowed to react for 10 minutes. Following the Epoxyl 9–5 reaction, the polymer solution was precipitated by addition to isopropyl alcohol (about equal volume of alcohol to polymer solution). The precipitated polymer was separated from the alcohol and solvent and dried in a vacuum at 160–212° F. for 30–60 minutes. The dried polymer was chopped in a polymer grinder and treated with two parts of antioxidant per 100 parts of total polymer. The antioxidant employed was Polygard HR, 1.5 parts and BHT 0.5 part per 100 parts of total monomer. The stabilized polymer was redried in a vacuum oven until a constant weight was obtained. FIGS. 1(a) through 1(d) represent the gel permeation chromatographic curves obtained in the preparation of the polymodal branched block copolymer.

FIG. 1(a) represents the GPC curve of the polymer sample obtained following the polymerization of the first styrene addition wherein 0.04 part by weight of n-butyllithium per 100 parts by weight of styrene was employed.

FIG. 1(b) represents the GPC curve for the polymer sample obtained after the polymerization of the second portion of the styrene wherein 0.4 part by weight of n-butyllithium was employed per 100 parts by weight of styrene charged in that portion. The second styrene charge represents 40 percent of the total styrene monomer employed. FIG. 1(c) represents the GPC curve of the polymer sample obtained after the butadiene has been polymerized onto the polystyrene segments previously formed to produce the block copolymer.

FIG. 1(d) represents the GPC curve for the complete polymodal branched block copolymer of this invention.

The polymer samples represented in FIGS. 1(a) to 1(d) possessed the following properties:

| Figure | Melt flow | Inherent viscosity | $M_w$ | $M_m$ | HI |
|---|---|---|---|---|---|
| 1(a) | 1.6 | 0.83 | 251,000 | 213,000 | 1.18 |
| 1(b) | 9.4 | 0.58 | 161,000 | 47,000 | 3.4 |
| 1(c) | 17.3 | 0.57 | 142,000 | 59,000 | 2.4 |
| 1(d) | 1.3 | 0.80 | 217,000 | 106,000 | 2.1 |

The polymodal nature of the polymers of this invention are therein clearly depicted. The relatively high heterogenic index and relatively low melt flow are excellent supportive evidence for the excellent polymer processability of the polymodal branch block copolymers of this invention which is hereinafter demonstrated.

A regular radial polymer was prepared under like conditions and GPC curves obtained on the final radial polymer and on the polymer samples taken from each step in the polymerization process. The regular radial polymer was prepared according to the following polymerization conditions. To a three-liter stirred reactor was charged 1.2 pounds of cyclohexane solvent at room temperature. The reaction temperature was increased to 140° F. and 180 grams of styrene monomer and 0.3 pound of cyclohexane solvent were charged. 18.0 grams of 1.0 weight percent n-butyllithium in solution and 0.3 pound of cyclohexane solvent were added to the reactor. The reaction temperature was 141° F. The styrene monomer was allowed to polymerize for 25 minutes and the maximum temperature reached was about 180° F. Following the styrene polymerization, 45.0 grams of butadiene and 0.3 pound of cyclohexane solvent were added at a reaction temperature of about 149° F. The butadiene was allowed to polymerize for 25 minutes and 2.3 ccs. of Epoxol 9-5 in toluene containing 0.5 gram of Epoxyl 9-5 per cc. of solution and 0.5 pound of cyclohexane solvent were added. The Epoxol 9-5 was charged at a reactor temperature of 150° F. and allowed to react for 10 minutes. Following the Epoxyl 9-5 reaction, the polymer solution was precipitated and recovered and treated according to the same procedure as employed for the polymodal branch block copolymer. FIG. 2(a) illustrates the GPC curve of the polymer sample obtained following the polymerization of the first styrene charge and was produced with 0.10 part of n-butyllithium per 100 parts of styrene monomer by weight. FIG. 2(b) represents the GPC curve of the polymer sample obtained following the polymerization of the butadiene charge to form the styrene/butadiene block copolymer. The butadiene was present in an amount to provide 20 weight percent butadiene of the total weight of the polymer.

Figure 2C:
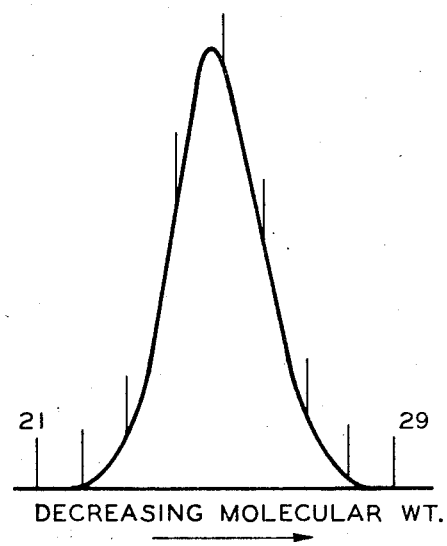
Figure 2A:
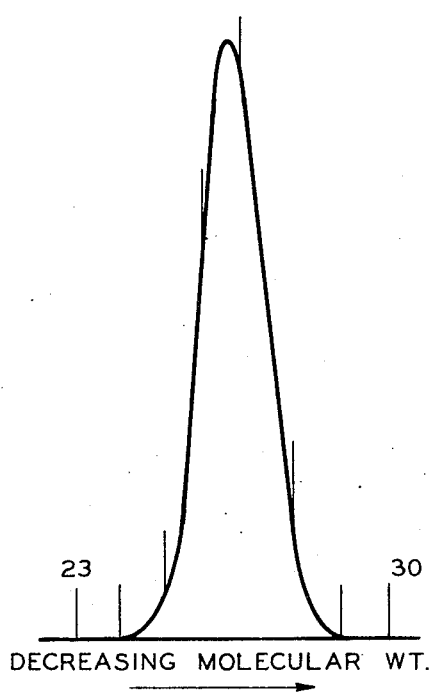

FIG. 2(c) represents the final radial polymer produced, i.e., after coupling with the polyfunctional treating agent Epoxyl 9-5. The polyfunctional treating agent was charged in an amount to provide 0.5 weight percent of treating agent per total weight of monomers employed. Epoxol 9-5 was employed in a toluene solution containing 0.5 gram of Epoxol 9-5 per cc. of solution. The polymer samples represented in FIGS. 2(a) to 2(c) possessed the following properties:

| Figure | Melt flow | $M_w$ | $M_n$ | HI |
|---|---|---|---|---|
| 2(a) | 55.0 | 76,000 | 65,000 | 1.17 |
| 2(b) | 14.0 | 95,000 | 82,000 | 1.16 |
| 2(c) | 1.5 | 179,000 | 132,000 | 1.35 |

The absence of the polymodal configuration of the GPC curve when compared to the GPC curve of the polymodal branch block copolymer is evident. Although the melt flow of the regular radial is very nearly that of the polymodal branch block copolymer, the lower heterogenic index is apparent. It is clear from the foregoing GPC data that there exists many distinguishing features between the polymodal branch block copolymers of this invention and the prior art branched polymers.

EXAMPLE V

The following example is presented to illustrate the outstanding processing properties of the polymodal branch block copolymers of this invention. Polymers possessing various outstanding properties of strength, clarity, etc., are of little value unless the polymer can be easily processed and employed in conventional equipment. The resinous polymers are obviously required to undergo flow in the molten state during the course of manufacture and fabrication of products and the important processing operations such as extrusion, molding, calendering, etc., all involve the behavioral flow of the molten or relatively fluid polymer.

Table IV contains data illustrating that the polymodal polymer of this invention flows better for a given set of conditions than the regular radial polymers. The higher the value for the injected molded spiral flow data, i.e., the better the flow and processability.

| Run number | Type of polymer | Percent butadiene [3] | Melt flow [3] | Spiral flow [4] |
|---|---|---|---|---|
| 1 | Regular radial [1] | 15 | 3.4 | 9.7 |
| 2 | do [2] | 25 | 3.1 | 8.9 |
| 3 | do [1] | 30 | 2.6 | 9.8 |
| 4 | Multiple addition [1] | 20 | 2.9 | 14.1 |
| 5 | do [2] | 20 | 2.4 | 13.7 |

[1] Prepared as in Example I.
[2] Prepared as in Example I except polyfunctional treating agent silicon tetrachloride at 0.10 part by weight per 100 parts by weight total monomer
[3] As reported in Table I.
[4] Spiral flow determined from injection mold in inches at 410° F. at 17,000 p.s.i.

Melt flow characteristics of the polymodal polymers of this invention and the regular radial polymers as shown by CIL data (Canadian Industries, Limited) obtained at 200° C., according to ASTM D-1703-62 are shown in FIG. 3.

A log-log plot of melt viscosity versus shear rate in reciprocal seconds is reported in FIG. 3. The shear rate, a function of the size of the hole and the pressure used to force the polymer through said hole, and the melt viscosity are calculated according to ASTM D-1703-62. In general, the lower the melt viscosity for any given shear rate, the better the processability of the polymer especially for high speed injection molding, wire coating, and the like. Also, the steeper the slope, the better the shear response and the better the processability for the above high speed applications.

The regular radial polymers represented in FIG. 3 were produced according to Example I. The regular radial polymer designated (A) had a melt flow of 3.0, regular radial, (B) had a melt flow of 9.0. Polymodal polymers of this invention are represented by Run C with a melt flow of 3.0. It is therein also demonstrated that the polymodal polymers flow better at these conditions than a 9.0 melt flow regular radial polymer. The steeper slope of the CIL curve for the polymodal polymer indicates that these polymers exhibit increased shear response over the regular radial polymers. This means that the polymodal polymers respond better to increased shear rates and flow faster.

The injection molded spiral flow data and the CIL data correlate very well and demonstrate that the polymodal polymers of this invention possess improved processing characteristics.

Summarily, the novel resinous polymodal branched block copolymers produced according to the process of this invention possess a combination of properties including excellent processability and articles formed therefrom exhibit outstanding transparency, environmental stress cracking resistance, and impact strength. The combination of these properties in a single polymer represents a significant advancement in the polymer field.

As will be evident to those skilled in the art, various modifications of this invention can be made or followed in light of the disclosure and the discussion herein set forth without departing from the scope or the spirit thereof.

We claim:
1. A resinous radial polymer comprising from about 70 to 95 weight percent polymerized monovinyl-substituted aromatic hydrocarbon monomer containing from about 8 to 18 carbon atoms per molecule and from about 30 to 5 weight percent polymerized conjugated diene monomer containing from about 4 to 12 carbon atoms per molecule; said polymer having a melt flow in the range of about 0.5 to 20.0 as determined by ASTM D-1238-65T, condition G; copolymer branches forming said radial configuration being at least three in number and further being of a block configuration; said branches being of polymer demonstrating a plurality of modes on a gel permeation chromatograph curve prior to coupling with a polyfunction agent to produce said polymer; said polymer when formed into articles demonstrating a haze transmittance in the range of about 0 to 20 percent as determined by ASTM D-1003-61, Procedure A, a falling ball impact strength value in ft.-lbs. of at least 1.0 and environmental stress-cracking resistance value in days of at least 100 days at zero percent failure.

2. The polymer of claim 1 wherein said polymer comprises from about 75 to 85 weight percent polymerized monovinyl-substituted aromatic hydrocarbon monomer and from about 25 to 15 weight percent polymerized conjugated diene monomer, said polymer having a melt flow in the range of about 1.0 to 5.0, said polymer when formed into articles demonstrating a haze transmittance in the range of about 0 to 10 percent and a falling ball impact strength value of at least 5 to 16.

3. A polymerization process for preparing resinous branched block copolymers comprising the sequential steps:
 (a) contacting under polymerization conditions at a temperature up to about 250° F. a monovinyl-substituted aromatic hydrocarbon monomer containing from about 8 to 18 carbon atoms per molecule with an organolithium polymerization initiator containing from about 1 to 20 carbon atoms per molecule wherein said monovinyl-substituted aromatic hydrocarbon monomer is employed in an amount to provide from about 40 to 90 weight percent of the total monovinyl-substituted aromatic hydrocarbon employed in preparing said copolymer wherein said initiator is employed in an amount to provide from about 0.01 to 0.2 part by weight of initiator per 100 parts by weight of said monomer and continuing said contacting for a period of time sufficient to polymerize essentially all of said monovinyl-substituted aromatic hydrocarbon monomer;
 (b) charging to the polymerization reaction product of step (a), in one or more increments, the remaining monovinyl-substituted aromatic hydrocarbon monomer representing from about 10 to 60 weight percent of said total monovinyl-substituted aromatic hydrocarbon monomer employed in preparing said copolymer, wherein for each incremental charge of monovinyl-substituted aromatic hydrocarbon monomer additional said organolithium initiator is provided in an amount from about 0.1 to 1.5 parts by weght of said initiator per 100 parts by weight of said incremental charge of monomer, wherein after each monomer and initiator charged a sufficient contacting time is allowed to permit essentially complete polymerization of the newly added monomer, wherein the amount of initiator employed per 100 parts by weight of each incremental monomer charge of step (b) exceeds the amount of initiator employed in step (a) by at least 0.1 part of initiator per 100 parts of monomer by weight and wherein the total amount of said monovinyl-substituted aromatic hydrocarbon monomer employed in steps (a) and (b) comprises from about 70 to 95 weight percent of the total weight of said branched block copolymer based upon the total weight of all of the monomers employed;
 (c) charging to the polymerization reaction product of step (b) a conjugated diene monomer containing from about 4 to 12 carbon atoms per molecule and polymerizing to essential completion said diene monomer in the presence of said reaction product to form a block copolymer, and wherein the amount of said diene monomer comprises from about 30 to 5 weight percent of the total weight of said branched block copolymer based upon the total weight of all of the monomers employed; and
 (d) charging to the polymerization reaction product of step (c) a polyfunctional treating agent capable of reacting with terminal lithium atoms on a preformed polymer to form a branched polymer wherein said polyfunctional treating agent is employed in an amount to provide from about 0.05 to 2 equivalents of said polyfunctional treating agent per gram atom of lithium employed in said polymerization process.

4. The polymerization process of claim 3 wherein said contacting under polymerization conditions is at a temperature below about 230° F., wherein the amount of monovinyl-substituted aromatic hydrocarbon monomer employed in step (a) is at least 60 weight percent of the total monovinyl-substituted aromatic hydrocarbon monomer employed in preparing said copolymer, wherein said initiator employed in step (a) is in an amount to provide from about 0.03 to 0.10 part by weight of initiator per 100 parts by weight of said monomer, wherein the amount of monovinyl-substituted aromatic hydrocarbon monomer employed in step (b) is less than 40 weight percent of said total monovinyl-substituted aromatic monomer employed in preparing said copolymer, wherein from about 0.3 to 1.5 parts by weight of said initiator per 100 parts by weight of said incremental charge of monomer is employed in step (b), wherein the amount of initiator employed per 100 parts by weight of each incremental monomer charged (s) of step (b) exceeds the amount of initiator employed in step (a) by at least 0.2 part of initiator per 100 parts of monomer by weight, wherein said conjugated diene monomer is employed in an amount to provide from about 25 to 15 weight percent of the total weight of said branched block copolymer based upon the total weight of all of the monomers employed, and wherein from about 0.5 to 1.5 equivalents of said polyfunctional treating agent is employed per gram atom of lithium employed in said polymerization process, and wherein said initiator can be represented by the formula RLi wherein R is a hydrocarbon radical selected from aliphatic, cycloaliphatic, or aromatic radicals containing from about 1 to 20 carbon atoms per molecule.

5. The process of claim 3 wherein said contacting step (a) includes the addition of .005 to 5 weight percent of tetrahydrofuran based on the total amount of monomer employed in preparing said branched block copolymer.

6. The process of claim 4 wherein said contacting step (a) includes the addition of about .05 to .1 weight percent of tetrahydrofuran based on the total weight of monomer employed for preparing the branched block copolymer.

7. The process of claim 3 wherein said polyfunctional treating agent contains at least three functional groups capable of reacting with terminal lithium atoms on a preformed polymer and said polyfunctional treating agent is selected from the polyepoxides, the polyamines, the polyisocyanates, polyaldehydes, polyhalides, polyketones, or tin compounds.

8. The process of claim 3 wherein said polyfunctional treating agent is epoxidized linseed oil, said initiator is n-butyllithium, said conjugated diene is butadiene and said monovinyl-substituted aromatic hydrocarbon is styrene.

9. The process of claim 3 wherein said polyfunctional treating agent is a difunctional treating agent, said agent being a monomeric material capable of addition to itself.

10. The process of claim 4 wherein said polyfunctional treating agent is selected from silicon tetrachloride, tetraallyltin, stannic fluoride, or epoxidized linseed oil.

11. An article of manufacture comprising the resinous polymer of claim 1.

12. The process of claim 3 wherein step (b) comprises charging said organolithium initiator to the reaction product of step (a) prior to charging said incremental charge of monomer.

References Cited

UNITED STATES PATENTS

| | | | |
|---|---|---|---|
| 3,135,716 | 6/1964 | Uraneck et al. | 260—45.5 |
| 3,281,383 | 10/1966 | Zelinski et al. | 260—23.7 |
| 3,507,934 | 4/1970 | Minor et al. | 260—876 |
| 3,402,159 | 9/1968 | Hsieh | 260—85.1 |
| 3,513,056 | 5/1970 | Middlebrook | 156—309 |

JOSEPH L. SCHOFER, Primary Examiner

R. A. GAITHER, Assistant Examiner